No. 747,629. Patented December 22, 1903.

UNITED STATES PATENT OFFICE.

WILHELM NASCHOLD, OF UERDINGEN, GERMANY, ASSIGNOR OF ONE-HALF TO THE FIRM CHEMISCHE FABRIK UERDINGEN LIENAU AND CO., OF UERDINGEN, GERMANY.

PROCESS OF PURIFYING PINENE HYDROCHLORID.

SPECIFICATION forming part of Letters Patent No. 747,629, dated December 22, 1903.

Application filed October 16, 1902. Serial No. 127,579. (No specimens.)

*To all whom it may concern:*

Be it known that I, WILHELM NASCHOLD, doctor of philosophy, a subject of the German Emperor, residing at Uerdingen-on-the-Rhine, Kingdom of Prussia, German Empire, have invented new and useful Improvements in Processes of Purifying Pinene Hydrochlorid, of which the following is a specification.

My invention relates to the processes of purifying pinene hydrochlorid, and has for its object to render the pinene hydrochlorid more stable and more suitable for technical use, especially as a substitute for camphor.

The technical employment of pinene hydrochlorid, ($C_{10}H_{17}Cl'$,) otherwise termed "hydrochloric turpentine spirit" or "artificial camphor," has hitherto mainly failed, because the product as heretofore manufactured will not remain neutral for any length of time unless too costly and disadvantageous purifying processes are resorted to—such, for example, as repeated recrystallization from alcohol. The formation of acids when pinene hydrochlorid manufactured in the known manner is stored is caused, in the first place, by the presence of by-products, which are ordinarily formed in the process, which readily liberate hydrochloric acid, while pinene hydrochlorid itself is a comparatively permanent substance, which in considerable degree can only be decomposed at high temperatures and by energetically-acting agents. The frequently-repeated proposition to produce a practical preparation by neutralizing with alkalies the free acids which are present, followed by distillation or sublimation, has not attained the desired end, because by this means only the free acids which are present at the time the treatment takes place can be removed, while the formation of free hydrochloric acid by the decomposition of the subproducts when the substance is stored can obviously only be partially and inefficiently prevented in such a manner.

The process which forms the subject of this invention has for its object the production of a pinene hydrochlorid which remains neutral when the substance is stored and is based upon the novel observation that the subproducts which readily liberate hydrochloric acids, which are inherent in the formation of pinene hydrochlorid and which are the cause of the defective keeping qualities of the product, may be removed by careful saponification. In accordance with this discovery the present process consists in submitting raw or, if desired, preliminarily-purified pinene hydrochlorid to the action of saponifying agents, the condition being, however, observed that only the subproducts shall be decomposed and this quite or practically completely, while the pinene hydrochlorid remains practically unattacked. In order to prove that the pinene hydrochlorid is not attacked to any extent, simple experiments may be made with pure material. If another purifying process is carried out, it is sufficient to continue the saponification until the final product no longer exhibits any unsaponified particles.

In carrying out the process described above known saponifying agents may be employed. First among these come water, dilute acids, alkalies, alkaline earths, and carbonates of the alkalies and alkaline earths. The temperature should preferably be so high that the raw pinene hydrochlorid is completely liquefied. At lower temperatures the saponification may readily be incomplete or it may occupy too long a time. A suitable temperature is from 80° to 100° centigrade, and the action is facilitated by intimate mixing by means of an agitator or the like mechanism. Owing to the volatility of the product, it is preferable to employ closed vessels. The quantitive proportions to be employed vary according to the properties of the raw product and must be determined for each case by the expert operator. The termination of the operation may, for example, be recognized, owing to the fact that a sample boiled with dilute alcohol free from acid will no longer yield any considerable quantity of free acid. It is, however, better to determine the saponifying number in the usual manner with a sample which is not too small and compare it with that of pure pinene hydrochlorid, which may be ascertained under like conditions of saponification once for all. Pure pinene hydrochlorid is itself not absolutely invariable under the usual conditions for fixing the saponifying number, but is gradually decomposed to a small extent. There is therefore a certain, although only a very small, consumption of alkali, which is dependent upon the conditions of experiment and which should not be neglected in exact operations.

Example: Five grams pure pinene hydrochlorid recrystallized many times from alcohol is boiled at a reflux cooler for thirty minutes in a water-bath with a measured quantity of standard soda or potash lye free from carbonic acid and a quantity of alcohol sufficient for causing solution, then cooled and diluted with a proportionate quantity of pure water free from carbonic acid and titrated back with standard acid, phenolphtalein being employed as indicator. From the consumption of standard alkali, is calculated in the usual manner the saponifying number of pure pinene hydrochlorid proper for the selected experimental conditions. Thereupon the saponifying number for the product to be treated may be exactly determined under like conditions. From the found saponifying number may be calculated the quantity of sodium-carbonate solution of the desired concentration necessary for saponification. There is then introduced into a boiler provided with a heating-jacket efficient agitating mechanism and a gas-discharge circuit and which is adapted to be closed, a weighed quantity of the raw product and somewhat more than the calculated quantity of sodium-carbonate solution. The mixture is then heated to about 80° to 100° and stirred until a sample taken out and freed from soda by washing and treated in a centrifugal machine does not give a higher saponifying number than pure pinene hydrochlorid. When this point is reached, the mixture is allowed to stand and the product is separated and washed in the usual manner. The product obtained in this manner will, if carefully stored, retain its natural reaction for a long period. A defect in the product obtained in this manner consists in the fact that it contains considerable quantities of oily substances, which lower the melting-point and prejudically affect the technical utility. The removal of the oily substances by distillation, sublimation, or mechanical separation is not satisfactory, as, on the one hand, the boiling-point and the volatility of the oil differ only slightly from those of the main product, while, on the other hand, great mutual solubility of the pinene hydrochlorid and the oils is present. While, therefore, the method described employed alone cause considerable loss of pure material, it has been found that the separation of the oily subproducts by distilling the pinene hydrochlorid with steam and sublimation is almost a complete success and gives a good yield of pinene hydrochlorid if the oily substances are chemically altered in a suitable manner so that their volatility, either alone or with steam, becomes very small. Such an alteration may be obtained owing to the fact, which has been observed, that the said oily substances are organic compounds of small stability, which by means of vigorously-acting agents known for this purpose, especially those of an acid character, readily undergo an almost complete resinification. In effecting such resinification care must again be taken that the conditions are such that any appreciable action of the medium employed upon the pinene hydrochlorid will not take place. Concentrated sulfuric acid has shown itself peculiarly suited for the separation of the oily subproducts. Contrary to most compounds of the terpene group, pinene hydrochlorid strongly resists concentrated sulfuric acid and is practically insoluble therein at ordinary and even at moderately higher temperatures. The oily subproducts, on the other hand, are for the greater part dissolved by the acid and resinified under like conditions. It is therefore permissible to employ concentrated sulfuric acid as resinifying agent for the purpose in view and at the same time it is possible to remove the greater part of the subproducts by mechanical separation, while the resinification process described above does not necessitate any subsequent distillation or sublimation.

Example I: The saponified product or the oily constituents separated therefrom in any convenient manner are heated with sulfuric acid of, say, 1.5 specific weight and while stirring to a temperature of 80° to 100° centigrade. The duration of the reaction depends upon the proportion of oil in the product, the quantity and concentration of the acid, and the intimacy of the mixing and may be readily determined by simple experiment. Thereupon the product separated from the acid is neutralized with sodium carbonate and distilled with steam.

Example II: The pinene hydrochlorid treated with saponifying agents in the manner above described is mixed with about the same volume of concentrated sulfuric acid, any considerable heating being avoided, and the mixture is poured upon ice and distilled with steam.

Example III: Raw pinene hydrochlorid is freed from readily-saponified constituents by treatment with a soda solution in the manner indicated above. It is then separated from the aqueous solution and after cooling submitted to centrifugal treatment. The crystalline mass thus obtained is stirred with concentrated sulfuric acid into a thick paste two or three times and treated in a centrifugal machine, the acid coming from the purer products being systematically used for stirring with products of less purity. The product is then covered with water, neutralized by mixing with a sodium-carbonate solution, again treated in a centrifugal machine, and finally distilled with steam.

The resinification of the oily constituents may be combined with the saponification by effecting the two operations simultaneously. The resinifying medium—sulfuric acid, for example—then acts upon the raw product employed in such a manner as to saponify and resinify at the same time. The unification of the operations carries with it a disadvantage, however, inasmuch as owing to the unavoidable presence of free hydrochloric acid the apparatus employed is readily attacked. In most cases it is therefore preferable to maintain the reaction mixture alkaline or neutral for the saponification and to effect the resinification of the oils separately by means of sulfuric acid. In any case when it is desired to obtain a pure white product having a high-melting point further purification in accordance with known methods, such as distillation, sublimation, or the like, may be carried out. The pinene hydrochlorid purified in this manner is much better adapted for keeping than the products hitherto readily obtainable by technical means heretofore known, and more particularly it does not liberate any hydrochloric acid when kept. This product may, however, undergo a marked acid reaction if it is kept for any considerable time in the air or light or in the presence of moisture. This acid reaction is not, we have discovered, attributable to hydrochloric acid, but apparently to traces of organic acids which, under the influence of the oxygen in the atmosphere, are produced from small quantities of adherent subproducts. If, for example, a preparation which has become acid in this manner after a considerable lapse of time is washed in a little water, the aqueous extract will redden litmus, but not methyl-orange, and with nitrate of silver there is no precipitate.

It may be desired to impart to the pinene hydrochlorid, by the removal of the last traces of subproducts, such a degree of purity that it will retain its neutral reaction even under the influences above referred to. Of the known processes the only one which is suitable for such a purpose is that of crystallization from alcohol, which upon a large scale is both inconvenient and costly. The numerous methods proposed for distillation with steam and sublimation have proved wanting. It is essential in carrying out those processes that pinene hydrochlorid, together with water, should be heated for a long time to 100°, or alone to even higher temperatures. Now we have found that contrary to the known data as to the permanence of pinene hydrochlorid this substance in a pure condition is liable even at about 120° to 130° to the formation of traces of hydrochloric acid and oily substances. In the presence of water a slight but not inappreciable decomposition takes place even at 100°. The hydrochloric acid may be removed in the usual manner, but the traces of oily substances adhere obstinately to the main product and cause it to undergo an acid reaction, as already stated. The said processes therefore of themselves cause the formation of definite, even if small, quantities of undesirable subproducts, and are therefore obviously not suited for the prevention of such subproducts to the greatest possible extent. I have discovered that the desired degree of purity may be readily and certainly obtained if the pinene hydrochlorid is sublimed at a greatly-reduced pressure. By reducing the pressure in the first place the pinene hydrochlorid is completely freed from water and then is driven over in a comparatively short time at temperatures of not more than 50° to 100°. It is true that even under these conditions it does not appear to be absolutely invariable, but the decomposition taking place under these circumstances is so exceedingly small as not to be appreciable during the time necessary for sublimation. The smaller the pressure the lower will be the sublimation temperature, and so much the less change will there be of the formation of decomposition products. It is therefore advantageous to operate with as complete a vacuum as possible. In carrying out the sublimation regard must be had to the hitherto undescribed fact that pinene hydrochlorid is gradually decomposed even at temperatures of 100° and under by many metals, such as zinc and iron. The decomposition proceeds fairly rapidly once it has set in and is especially noticeable when the metals are slightly oxidized. It may be retarded by the addition of small quantities of alkaline agents, such as soda. Furthermore, those parts of the apparatus which come into contact with the pinene hydrochlorid at high temperatures may be formed of such materials as shall have been found by preliminary experiment to be fit. It may be advisable to repeat the sublimation for a second or greater number of times and to keep the first and last products separate.

Preparations of a high degree of impurity, and especially resinified preparations, should preferably be submitted to an ordinary purifying process, such as distillation with steam, before sublimation.

What I claim as my invention, and desire to secure by Letters Patent, is—

1. The herein-described process for preparing pinene hydrochlorid keeping itself in the neutral state, which consists in treating ordinary pinene hydrochlorid with a saponifying agent in such a manner as to split up only the readily-saponified subproducts associated with the said pinene hydrochlorid.

2. The herein-described process for preparing pinene hydrochlorid keeping itself in the neutral state, which consists in treating ordinary pinene hydrochlorid with a saponifying agent in such a manner as to split up only the readily-saponified subproducts, and with a resinifying agent in such a manner as to react only upon the oily subproducts with the said pinene hydrochlorid.

3. The herein-described process for preparing pinene hydrochlorid keeping itself in the neutral state, which consists in treating ordinary pinene hydrochlorid with a saponifying agent and with a resinifying agent in such a manner as to react only with the subproducts present, then subjecting the purified pinene hydrochlorid to sublimation under reduced pressure.

4. The herein-described process for preparing pinene hydrochlorid keeping itself in the neutral state, which consists in treating ordinary pinene hydrochlorid with sodium-carbonate solution in such a manner as to split up only the readily-saponified subproducts associated with the said pinene hydrochlorid.

5. The herein-described process for preparing pinene hydrochlorid keeping itself in the neutral state, which consists in treating ordinary pinene hydrochlorid with sodium-carbonate solution in such a manner as to split up only the readily-saponified subproducts and with sulfuric acid in such a manner as to resinify only the oily subproducts associated with the said pinene hydrochlorid.

6. The herein-described process for preparing pinene hydrochlorid keeping itself in the neutral state, which consists in treating ordinary pinene hydrochlorid with sodium carbonate and with sulfuric acid in such a manner as to react only with the subproducts present, then subjecting the purified pinene hydrochlorid to sublimation under reduced pressure.

In witness whereof I have hereunto signed my name, this 6th day of October, 1902, in the presence of two subscribing witnesses.

WILHELM NASCHOLD.

Witnesses:
   JOS. MÜLLER,
   FRANZ GIEBEL.